Oct. 25, 1966   J. R. DECKER   3,280,498
FISHING SINKER
Filed Oct. 12, 1964   2 Sheets-Sheet 2
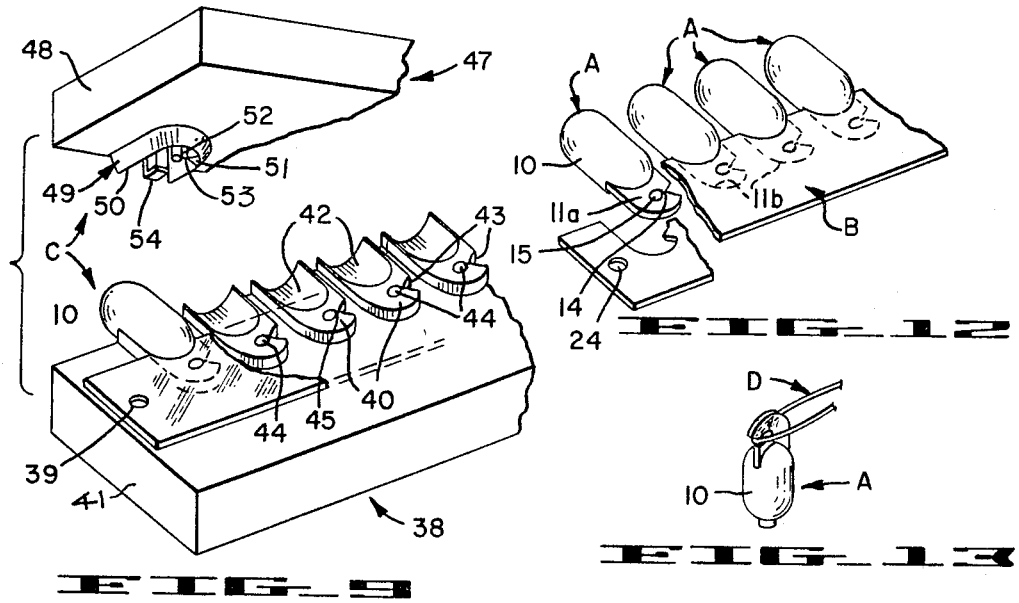
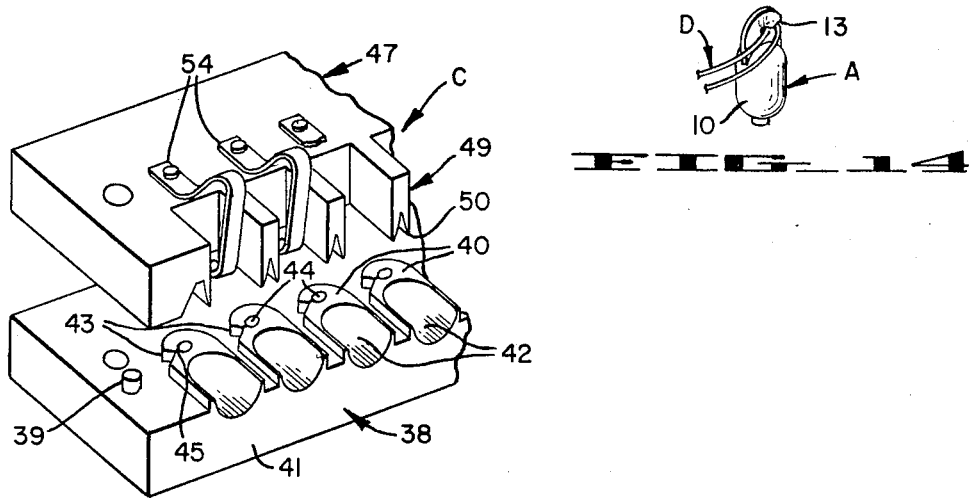
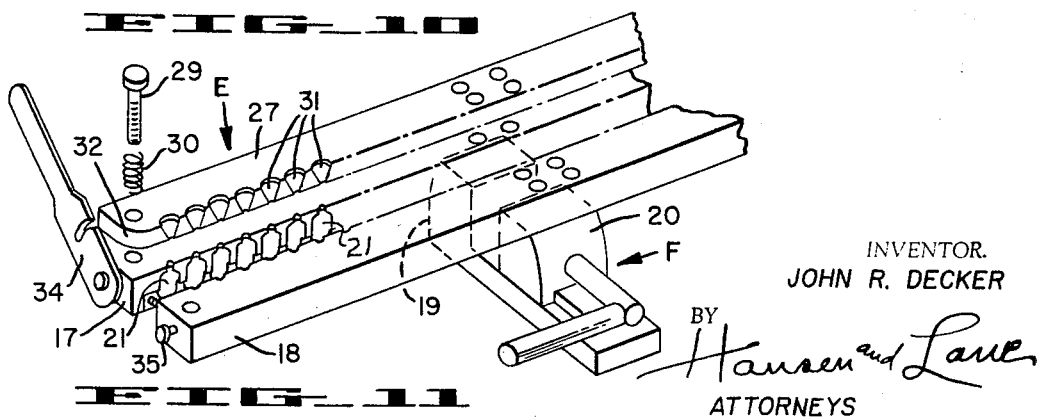
INVENTOR.
JOHN R. DECKER
BY Hansen and Lane
ATTORNEYS

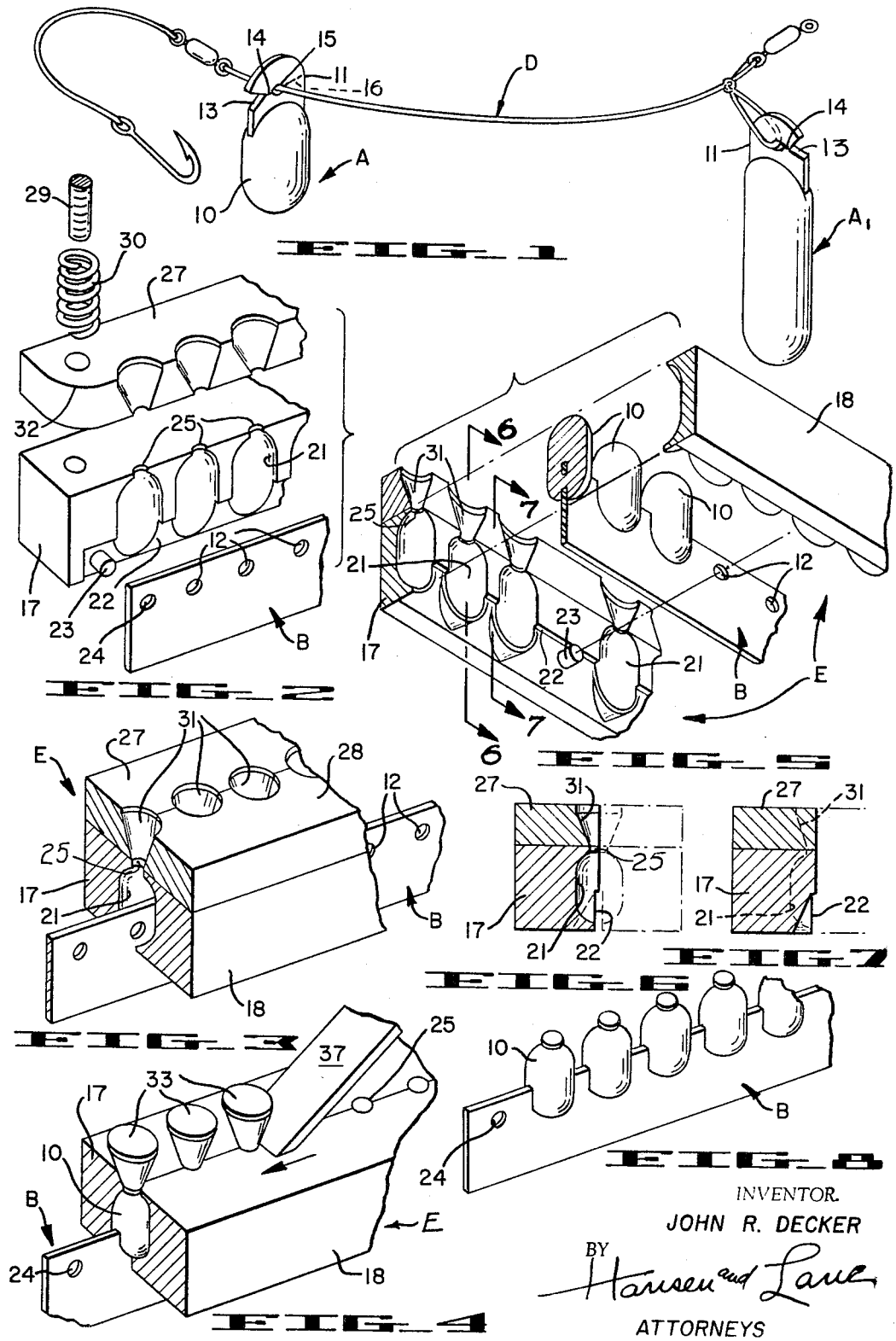

United States Patent Office 3,280,498
Patented Oct. 25, 1966

3,280,498
FISHING SINKER
John R. Decker, 5710 Harder St., San Jose, Calif.
Filed Oct. 12, 1964, Ser. No. 403,260
9 Claims. (Cl. 43—43.12)

The present application is a continuation-in-part of my application, Serial No. 326,289, filed November 26, 1963 under the title "Slidable Fishing Sinker," and pertains to an improvement in fishing sinkers and to a method of making them.

In the past a great deal of time, effort and ingenuity have been devoted to the making of improved fishing sinkers. Most of such prior art sinkers consist essentially of a weight element, such as a molded piece of lead, and means for attaching the weight element to a fish line or hook.

An object of the present invention is to provide means in a fishing sinker which facilitates attaching the sinker to, and detaching it from, a fishing line.

Another object of the invention is to provide a fishing sinker with a novel line attachment portion which will keep wear on a fishing line to which it is attached to a minimum.

A further object of the invention is to provide a fishing sinker having simple means for effecting attachment of the sinker to a fishing line, and assures that it will remain attached to such line until it is desired to detach it therefrom.

A further object of the invention is to provide a fishing sinker having means for attaching it to a fishing line, which means are positive in operation, convenient to use, permit easy attachment of the sinker in working position on a line, and easy detachment therefrom.

A further object of the invention is to provide a sinker having a weight element thereof molded onto a line attaching portion which projects beyond the weight element and is formed for connection to a fishing line.

A further object of the invention is to provide a sinker which will slide easily along a fishing line and will break off when snagged to release the line.

Another object of the invention is to mold a plurality of weight elements onto an edge portion of a strip of material, a portion of the strip of material being cut or scored adjacent each weight element to provide line attaching means for each weight element.

A further object of the invention is to provide an improved fishing sinker.

A further object of the invention is to provide an improved method for making fishing sinkers.

These objects and advantages of the invention will be apparent from the following description and the accompanying drawings, wherein:

FIG. 1 is a perspective view showing two fishing sinkers embodying the invention attached in different ways to a fragment of fishing line having a fish hook on one end thereof.

FIG. 2 is a fragmentary, perspective, exploded view showing portions of one of the mold bars, a gate bar, and a fragment of the strip material onto which a plurality of the weight elements are molded.

FIG. 3 is a fragmentary, perspective view showing a portion of the mold assembled in molding position with a fragment of the strip material gripped therein.

FIG. 4 is a fragmentary, perspective view of the mold bars after the weight elements have been molded onto the strip material and the gate bars have been swung open, and showing the gates being sheared off.

FIG. 5 is a fragmentary, exploded, perspective view from beneath, showing the mold bars separated, a portion of the strip material with weight elements molded thereon, and showing how the lower portions of the mold bars are relieved to minimize the zone of contact between the hot mold bars and an insert strip.

FIGS. 6 and 7 are sectional views taken along lines 6—6 and 7—7, respectively, of FIG. 5.

FIG. 8 is a fragmentary, perspective view showing a plurality of the weight elements molded onto a marginal portion of a plastic strip.

FIG. 9 is a fragmentary, perspective view showing an insert strip having a weight element molded thereon and mounted in a cutting die for cutting or scoring, notching, and piercing the strip to form the line attachment portion of the sinker.

FIG. 10 is a fragmentary perspective view showing the opposite side of the cutting dies from that shown in FIG. 9.

FIG. 11 is a perspective view in reduced scale showing the mold bars mounted on a vise and provided with end clamps for manipulation and clamping of the mold bars, only a few of the cavities being shown, one gate bar being shown, the right hand end portions being broken away.

FIG. 12 is a fragmentary, perspective view showing a portion of the strip material having a plurality of the weight elements thereon, and after the strip material has been acted upon by the cutting or scoring dies of FIGS. 9 and 10, one of the completed sinkers being shown removed from the strip material.

FIG. 13 is a perspective view showing a sinker embodying the invention being attached to a fishing line.

FIG. 14 is a view similar to FIG. 13, but showing the sinker being detached from a fishing line.

Brief description

Briefly, in the form of the invention illustrated in FIGS. 1–14, a fishing sinker A comprises a weight element 10 of a material of high specific gravity, for example lead, mounted on a line attaching portion 11 of suitable stiff, resiliently bendable and preferably frangible material having suitable heat resistance properties.

In making the sinker A, anchoring means such as a hole 12 preferably is provided in a plastic strip B, which may be of acetate plastic, in the zone where each weight element 10 is to be provided thereon.

A portion of the strip material adjacent each weight element 10 molded thereon is marginally scored or cut to free it from the remainder of the strip B as by means of dies C (FIGS. 9 and 10), thus to provide a line attaching portion 11 for each weight element 10.

Each line attaching portion 11 has a lateral notch 13 therein, the apex of which notch communicates, through a transversely extending slit 14, with a line-receiving hole 15. The distance between each hole 15 and the side of the line attaching portion 11 opposite the notch 13 determines the break-away strength of the sinker A when the latter is attached to a fishing line D as shown in FIG. 1. The smaller this distance is, the less will be the break-away pull on the fishing line required to free it in the event that the sinker should become snagged during use. This break-away strength preferably is less than the tensile strength of a fishing line on which the sinker is to be used.

Detailed description

Referring to the drawings in greater detail, in the illustrated form of the invention shown in FIGS. 1–14, each fishing sinker A comprises a weight element 10 and, integrally molded therein, a line attaching portion 11.

A mold E (FIGS. 2, 7 and 11) for molding a plurality of weight elements 10 onto the marginal portion of a strip B comprises a pair of substantially similar, but reversed, mold bars 17 and 18, which are mounted one on each of the jaws 19 and 20 of a quick-opening vise F, with the mold cavities 21 of the two mold bars facing and in register with each other in complementary pairs.

A shallow-strip-receiving recess 22 (FIGS. 2, 5, 6 and 7) which is in depth half the thickness of a strip B to be gripped between the mold bars 17 and 18, is formed along the lower portion of each mold bar. Locating pins 23 are mounted in one of the mold bars for example the mold bar 17, at desired intervals along the strip receiving recess 22 therein. These locating pins 23 project a sufficient distance to fit into locating holes 24 provided therefor in each strip B as the latter is fitted into its recess 22. Each strip B is provided with weight engaging means, such as the weight-anchoring holes 12 therein, one to register with each complementary pair of mold cavities 21 in the mold bars 17 and 18.

A small gate opening 25 is provided at the upper end of each complementary pair of mold cavities 21, and a pair of gate bars 27 and 28 are pivotally mounted, one on each mold bar 17 and 18. Each gate bar is pivotally connected to its associated mold bar by a pivot screw 29 (FIGS. 2 and 11), which is screwed into a threaded hole provided therefor in its associated mold bar. Each gate bar is biased downwardly into closely superposed, fitted relation with its associated mold bar by a coil spring 30, which encircles each pivot screw 29 and is held in compression between the head of the screw and its associated gate bar.

A plurality of inverted, frusto-conical gate openings 31 are provided in registering, complementary pairs in the gate bars 27 and 28, one complementary pair of gate openings being located directly above each pair of mold cavities and in register with the gate opening 25 therein when the parts of the mold are closed, molding position as shown in FIG. 3.

The inner corners 32 (FIGS. 2 and 11) of the gate bars 27 and 28 are rounded off at their pivoted ends so that the gate bars can be swung open to expose the gates 33 as in FIG. 4 after a molding operation has been completed and before the mold bars 17 and 28 are separated.

Each strip B is of required stiffness and resilient bendability for its intended purpose, and has sufficient heat resistance so that it will not be melted or destructively affected by the molding of the weight elements 10 thereon. Also, it is of a material which will not cut or abrade a fishing line when mounted thereon, and is easily frangible when stressed beyond its elastic limit. At present a preferred material for the strip B is acetate plastic, but since plastics or other materials having desired characteristics for the line attaching portions 11 can be readily formulated or provided by those familiar with the art, the details thereof are not set forth herein.

When a strip B fitted into its recess 22 and onto the locator pins 23, the mold bars 17 and 18 are moved to their closed position, shown in FIG. 3, and are firmly secured together by means of the vise F and a pair of lever type end clamps 34 (FIG. 11), one of which is provided on each end of the mold bar 17 for camming, clamping engagement with a screw 35 projecting endwise from the other mold bar 18.

For molding, the gate bars 27 and 28 are centrally aligned above the mold bars 17 and 18 as shown in FIG. 3, and are secured to each other, and to the mold bars, by suitable clamping means, not shown. Suitable moldable material of high specific gravity, such as, for example, molten lead, is then poured through the gate openings 31 into the mold cavities 21. When this molten material has set, hardened or cooled, as the case may be, the gate bars 27 and 28 may be released and swung outwardly about their respective pivot screws 29. The projecting gates 33 (FIG. 4) may then be severed as by running a sharp chisel 37 along the tops of the closed mold bars 17 and 18. The gate-severing step can also be accomplished by swinging one or the other of the gate bars transversely across the tops of the mold bars 17 and 18, which action obviously will shear off the gates 33, leaving the weight elements 10 molded onto the plastic strip B as shown in FIGS. 5 and 8. If desired, the gates 33 may be left on, and in that case the weight of the gates will be added to the weight of the elements 10 to provide heavier sinkers than is the case when the gates are removed.

Upon separating the mold bars 17 and 18 after completion of the molding and gate severing operations, as shown in FIG. 5, the strip B with the weight elements 10 molded thereon is removed from the locator pins 23 and is ready for the cutting or scoring operation which forms the line-attaching portions 11. This cutting or scoring operation preferably is accomplished by means of suitable cutting dies, one form C of which is illustrated in FIGS. 9 and 10.

The lower cutting die 38 has a plurality of locator pins 39 thereon corresponding to those 23 of the mold bar 17 referred to previously herein. A plurality of lower cutting die elements 40 are mounted on a lower die block 41, each lower die element being provided with a cradle 42 to receive and support a weight element 10 molded onto a plastic strip B as shown in FIG. 9. With the weight elements supported in their cradles, the plastic strip B will rest upon the lower cutting die elements 40, each of which is shaped and constructed to co-operate with an upper die 47 to score or cut out from the strip B a line attaching portion 11 for each of the weight elements 10.

Each lower cutting die element 40 has a notch 43 in a side thereof, and a punch hole 44 located at a desired distance inwardly from the apex of the notch 43. A hole extends entirely through the lower die 38 beneath each piercing hole 44 to permit punchings from these parts to pass through the die block. A narrow gap 45 is provided communicating the inner apex of each notch 43 and its associated punch hole 45 to receive a slitting blade to be described later herein.

The upper die 47 comprises an upper die block 48 having a plurality of upper die elements 49 thereon for cooperation, one with each lower die element 40. Each upper die element 49 comprises a cutting blade 50 of generally horseshoe shape, and formed to co-operate with its associated lower die element 40 to cut or score the strip B to free a line attaching portion 11 from the strip B adjacent each weight element 10 thereon. Interiorly of a side of each upper die blade 50 is provided a V-shaped notch forming punch 51, which extends inwardly from the cutting blade 50 and is positioned to enter the notch 43 in its associated lower die element 40. A piercing punch 52 is also provided to cooperate with the punch hole 44 in each lower die element 40, and a thin, sharpened slitting blade 53 (FIG. 9) extends between the inner apex of each notch-piercing portion 51 and its associated, round, piercing punch 52. Each blade 53 co-operates with the gap 45 in its associated lower die element 40 to provide the line-receiving slit 14 in each line attaching portion 11, through which slit a fishing line D may be passed either into or out of the hole 15 upon bending the line receiving portion 11 as shown in FIGS. 13 and 14.

A stripper spring 54 is mounted to extend downwardly within each upper die element 49 to strip the material therefrom upon the completion of each cutting or scoring operation.

By employing material of uniform, but low strength for the strip B, the strength of the sinker to resist a pull on the line D in the event a sinker should become snagged, herein called "break-away strength," is determined by the strength of the material between the line receiving hole 15 and the edge of the line attaching portion 22 opposite the notch 13. In tests made to determine the breaking characteristics in such event, the line of break was found to be substantially in line with the slit 14 along a line indicated by the broken line 16 in FIG. 1. The closer the hole 15 is punched to the edge of the line receiving portion 11 opposite the notch 13, the less will be the break-away strength of the sinker. This break-away strength preferably is less than the tensile strength of a fishing line upon which the sinker is to be used.

The cutting dies may be mounted in a well known manner on a conventional die set (not shown), which may in turn be mounted on a conventional punch press (not shown) for cutting or scoring the line-attaching portions 11 for severance thereof from the remainder of the strip B. By regulating in a conventional manner the shut height of the dies C when the latter are mounted on a punch press or other mechanism, each line-attaching portion 11 can either be completely severed from the remainder of its strip B as shown at 11a in FIG. 12, or the outline of each line attaching portion 11 can be merely scored, so that the portions 11 remain in place in the strip B as a matrix, as shown at 11b in FIG. 12, but may be easily broken out, one at a time, when desired for use. In either event the line receiving holes 15 are punched cleanly out, and the slits 14 are cut clear through. For breaking away a sinker A from the remainder of the strip when the outlines of the portions 11 are merely scored as shown at 11b in FIG. 12, the strip B may be held in one hand, and a desired weight element 10 may be seized by the other. The sinker A of which the seized weight element is a part may then be broken free along the scored line separating the line attaching portion 11 from the remainder of the parent strip B.

The sinkers may be packaged in a number of ways for sale, but a presently preferred arrangement is to provide a retail sales unit comprising a selected length of plastic strip material with a desired number, for example six, of the sinkers thereon, each scored for easy break-away action. This strip of sinkers may be attached, as by staples or suitable adhesive material, to a card or label, not shown. Otherwise, if desired, the length of strip material can itself be used as a label, and the trademark or other data (not shown) printed directly thereon. Such a unit can be placed by a purchaser in his tackle box, and when a sinker is wanted he simply takes out this strip, breaks away a sinker along the scored line in the manner described previously herein, and puts away the remainder of the strip with the remaining sinkers therein, ready for subsequent use as required.

While specific means are illustrated for molding the weight elements 10 in multiples in a rapid and economical manner, it will be obvious to those familiar with the art that these elements can be made in numerous ways, such as by injection molding, die casting, extrusion, and other well known techniques, so long as they are made from a material of high specific gravity.

The line attaching portions 11 also may be made in numerous ways, for example by pre-scoring a plastic strip such as the strip B prior to molding the weight elements thereon, by employing molded or pre-punched elements for this purpose, and in other ways. Such modifications will of course be apparent to one conversant with the art, and would not constitute a departure from the present invention as defined in the appended claims.

The invention provides a simple, inexpensive, attractive, and highly effective fishing sinker, and one which can be easily and quickly attached to a fishing line as shown in FIG. 13, or removed therefrom as shown in FIG. 14. In each case the resilient bendability of the material from which the line attaching portion is made permits the latter to bend within its elastic limit to admit the line to be passed through the slit 14, and then to spring back to close the slit to its prior condition. The sinkers A can be attached to a line D either for easy sliding movement thereon as shown by the left hand sinker A of FIG. 1, or may be connected into a loop of the line for securing the sinker in a fixed position thereon as shown by the right hand sinker A of that figure. By making the line attaching portions 11 of a frangible material and locating the line receiving holes therein at a desired distance from the edge opposite the notch 13, the sinker will have a sufficiently low break-away strength to free the line in the event the sinker becomes snagged during use.

While I have illustrated and described a preferred embodiment of the present invention, and one modified form thereof, it will be understood, however, that various changes and modifications may be made in the details thereof without departing from the scope of the invention as set forth in the appended claims.

Having thus described the invention, what I claim as new and desire to protect by Letters Patent is defined in the following claims:

1. A fishing sinker for attachment to a fishing line comprising
    a weight element of high specific gravity, and
    a line attaching element of stiff resiliently bendable plastic sheet material partially embedded in the weight element and with a portion thereof projecting therefrom, said line attaching element having a line receiving hole in the portion thereof projecting from the weight element, and having a narrow slit extending transversely therein of a width substantially less than the thickness of a fishing line with which the sinker is to be used, such slit communicating such line receiving hole with a lateral edge of the line attaching portion, the line attaching portion being resiliently bendable within its elastic limit sufficiently to separate portions of the line attaching portion defining such slit to admit such fishing line through such slit into and out of such line receiving hole, the distance between the hole and the opposite lateral edge being greater than the thickness of the sheet material by an amount sufficient to prevent edgewise bending of the sheet material great enough to release a fishing line in the hole under working stresses applied to the sheet material by such line during use.

2. A fishing sinker according to claim 1 in combination with a fishing line having a swivel thereon wherein the line attaching portion has the line receiving hole therein of a diameter greater than that of the fishing line and smaller than said swivel, so that when mounted on said line the sinker is freely slidable along such line until it is arrested by encountering such swivel.

3. A fishing sinker for attachment to a fishing line comprising
    a weight element of high specific gravity, and
    a line attaching portion of resiliently bendable sheet material partially embedded in the weight element, and with a portion thereof projecting therefrom, which material is easily frangible when stressed beyond its elastic limit, said line attaching portion having a small line receiving hole therein, and having a narrow slit extending transversely therein of a width substantially less than the thickness of a fishing line with which the sinker is to be used, such slit communicating such line receiving hole with a lateral edge of the line attaching portion, the line attaching portion being resiliently bendable sufficiently to separate portions of the line attaching portions defining such slit to admit such fishing line through such slit into and out of such line receiving hole, the distance between the line receiving hole and the other lateral edge being such as to provide a desired break-away strength less than the tensile strength of a fishing line upon which the sinker is intended to be used.

4. A fishing sinker for attaching to a fishing line comprising
    a weight element of high specific gravity, and
    a line attaching portion of stiff resiliently bendable plastic sheet material partially embedded in the weight element, the line attaching portion having a small line receiving hole therein, and having a notch in a lateral edge thereof the line attaching portion also having a narrow slit transversely therein of a width substantially less than the thickness of a fishing line with which the sinker is to be used, such slit communicating such line receiving hole with the inner apex of such notch, the line attaching portion being resiliently bendable sufficiently to separate portions of the line attaching portions defining such slit to admit such fishing line through such slit into and out of such line receiving hole, the distance between the hole and the opposite lateral edge being greater than the thickness of the sheet material by an amount sufficient to prevent edgewise bending of the sheet material great enough to release a fishing line in the hole under working stresses applied to the sheet material by such line during use.

5. A fishing sinker according to claim 4 wherein the resiliently bendable sheet material is of uniform strength and is readily frangible when stressed beyond its elastic limit, the distance between the line receiving hole and the opposite lateral edge being also small enough to provide a break-away strength less than the tensile strength of a fishing line upon which the sinker is intended to be used.

6. A fishing sinker for attachment to a fishing line comprising
   a weight element of high specific gravity material and
   a line attaching portion of resiliently bendable sheet material partially embedded in the weight element, the weight element, the line attaching portion having a small line receiving hole therein and having also a narrow slit therein extending transversely of the line attaching portion and communicating such line receiving hole with a lateral edge of the line attaching portion, the portions of the line attaching portion defining such slit being spaced apart by a distance less than the thickness of a fishing line to which the sinker is to be attached, the distance between said hole and the opposite lateral edge of the line attaching portion being greater than the thickness of said sheet material, the line attaching portion being bendable transversely of its thickness within the elastic limit of the material of which it is made to separate the portions thereof defining such slit sufficiently to pass such fishing line through such slit into and out of such line receiving hole, and being resistant to bending edgewise in a direction which would separate the portions thereof defining such slit to prevent accidental release of a line during use.

7. A fishing sinker for attachment to a fishing line comprising
   a weight element of high specific gravity material and
   a line attaching portion of resiliently bendable sheet material partially embedded in the weight element and extending therefrom, the line attaching portion having a small line receiving hole in a portion thereof exposed beyond the weight element, the line attaching portion having also a narrow slit therein extending transversely of the line attaching portion and communicating such line receiving hole with a lateral edge of the line attaching portion, the portions of the line attaching portion defining such slit being spaced apart by a distance less than the thickness of a fishing line to which the sinker is to be attached, the distance between said hole and the opposite lateral edge of the line attaching portion being greater than the thickness of said sheet material, the line attaching portion being bendable transversely of its thickness within the elastic limit of the material of which it is made to separate the portions thereof defining such slit sufficiently to pass such fishing line through such slit into and out of such line receiving hole, and being resistant to bending edgewise in a direction which would separate the portions thereof defining such slit to prevent accidental release of a line during use.

8. A plurality of fishing sinkers for attachment to a fishing line comprising a series of spaced elements of high specific gravity, a strip of stiff, resiliently bendable sheet material partially embedded in the series of weight elements and extending endwise therefrom, said strip being scored to define line attaching portions substantially severed from and remaining within said strip, each line attaching portion having a line receiving hole in a portion thereof extending endwise from the weight element, and having also a narrow slit extending transversely therein of a width substantially less than that of a fishing line with which the sinker is to be used, such slit communicating such line receiving hole with a lateral edge of the line attaching portion, the line attaching portion being resiliently bendable sufficiently to separate portions of the line attaching portions defining such slit to admit such fishing line through such slit into and out of such line receiving hole.

9. A fishing sinker for attachment to a fishing line comprising
   a weight element of high specific gravity, and
   a line attaching portion of acetate plastic sheet material of uniform thickness and known breaking strength partially embedded in the weight element and extending therefrom, the line attaching portion having a small line receiving hole therein, and having a notch in a lateral edge thereof, the line attaching portion also having a narrow slit transversely therein, such slit communicating such line receiving hole with the inner apex of such notch, the distance between said hole and the opposite lateral edge of the line attaching portion being greater than the thickness of said sheet material, the line attaching portion being resiliently bendable transversely of its thickness within its elastic limit sufficiently to separate portions of the line attaching portions defining such slit to admit such fishing line through such slit into and out of such line receiving hole, and being highly resistant to edgewise bending to prevent accidental release of a line during use.

References Cited by the Examiner

UNITED STATES PATENTS

| | | | |
|---|---|---|---|
| 1,193,684 | 8/1916 | Gregory et al. | 43—44.92 |
| 1,201,113 | 10/1916 | Trester | 43—44.92 |
| 1,855,097 | 4/1932 | Chamberlaine | 43—42.45 |
| 2,002,122 | 5/1935 | McWane | 22—202 |
| 2,254,949 | 9/1941 | Messacar | 43—42.47 XR |
| 2,284,564 | 5/1942 | Ebersole | 43—44.92 |
| 2,481,346 | 9/1949 | Rigby | 43—44.92 XR |
| 2,518,634 | 8/1950 | Peterson | 43—44.92 XR |
| 2,801,491 | 8/1957 | Lawrence | 43—43.13 |
| 2,948,033 | 8/1960 | Gulick | 22—202 |

ABRAHAM G. STONE, *Primary Examiner.*

R. L. HOLLISTER, *Assistant Examiner.*